(12) United States Patent
Martin et al.

(10) Patent No.: US 9,391,866 B1
(45) Date of Patent: Jul. 12, 2016

(54) METHOD FOR QUALITATIVE ANALYSIS OF SYSTEM PERFORMANCE CORRELATION FACTORS

(71) Applicant: Sprint Communications Company L.P., Overland Park, KS (US)

(72) Inventors: Justin A. Martin, Olathe, KS (US); Margaret M. McMahon, Kansas City, MO (US); Brian J. Washburn, Kansas City, MO (US)

(73) Assignee: Sprint Communication Company L.P., Overland Park, KS (US)

( * ) Notice: Subject to any disclaimer, the term of this patent is extended or adjusted under 35 U.S.C. 154(b) by 355 days.

(21) Appl. No.: 14/080,245

(22) Filed: Nov. 14, 2013

(51) Int. Cl.
*G06F 15/173* (2006.01)
*H04L 12/26* (2006.01)

(52) U.S. Cl.
CPC .................................... *H04L 43/10* (2013.01)

(58) Field of Classification Search
USPC ................................. 709/223, 224, 225, 226
See application file for complete search history.

(56) References Cited

U.S. PATENT DOCUMENTS

| | | | | |
|---|---|---|---|---|
| 7,707,573 B1* | 4/2010 | Marmaros | ................. | G06F 8/61 709/224 |
| 2010/0332149 A1* | 12/2010 | Scholpp | ................. | C02F 1/008 702/25 |
| 2011/0145836 A1* | 6/2011 | Wheeler | ................. | G06F 9/542 719/314 |
| 2012/0278015 A1* | 11/2012 | Budhraja | ................ | H02J 3/008 702/62 |
| 2013/0317319 A1* | 11/2013 | Huang | ................. | A61B 5/7271 600/301 |

* cited by examiner

*Primary Examiner* — Liangche A Wang

(57) ABSTRACT

A method of maintaining server performance comprises receiving, at an analysis server, server performance metrics from at least one monitored server, wherein server performance metrics comprise information about processor usage, memory usage, and network activity and comparing the received metrics with a baseline of values that was established for the server performance metrics based on a variance analysis of historical values. The method further comprises determining that the value of at least one server performance metric of the monitored server is consistently above an upper limit of a range of acceptable deviation from the baseline, analyzing historical occurrences of similar departures of server performance metrics from the range of acceptable deviation, and generating an alert indicating that a risk pattern has been identified and suggesting shutting down a locked process on the monitored server in order to return the server performance metrics to values within the range of acceptable deviation.

17 Claims, 7 Drawing Sheets

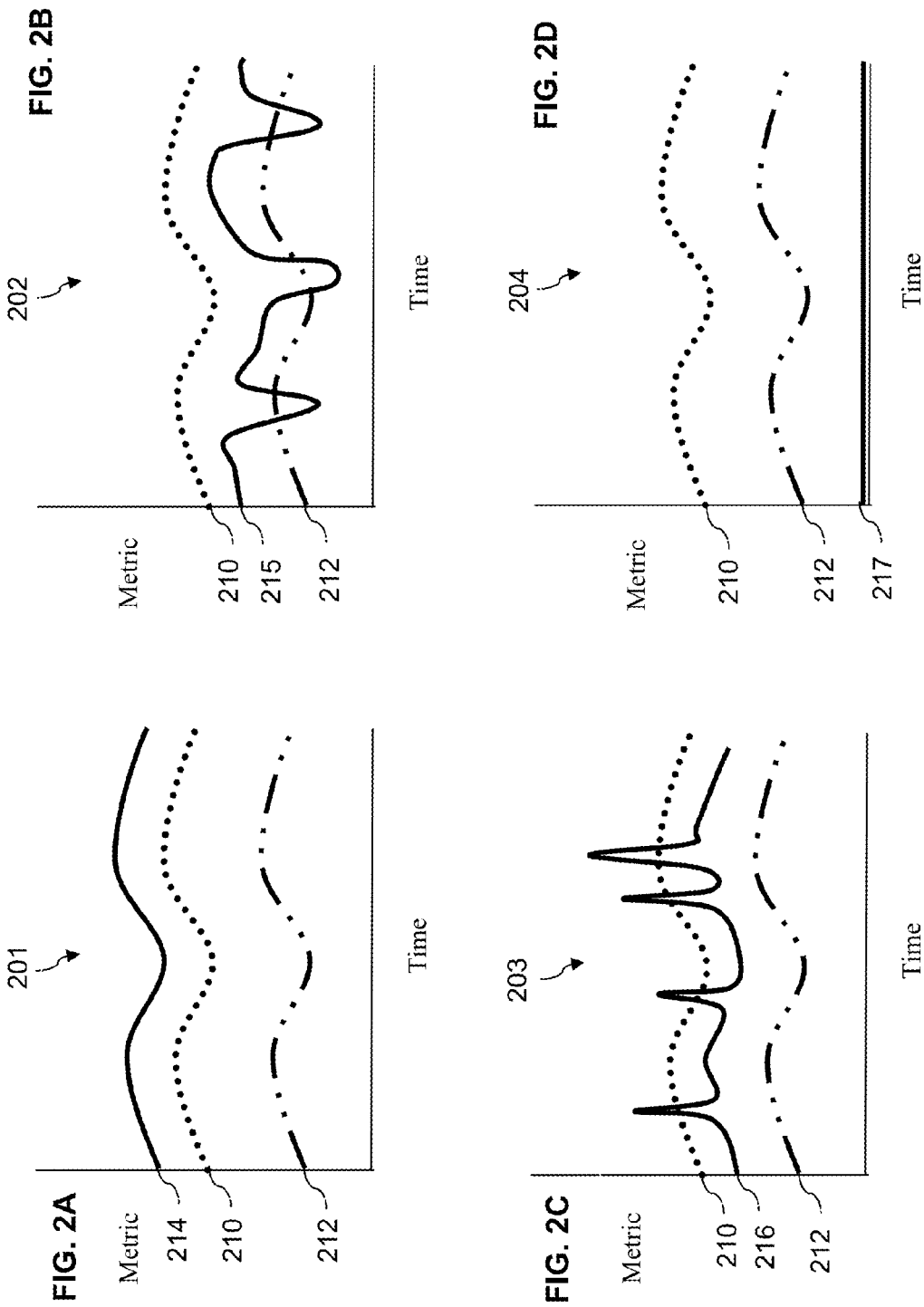

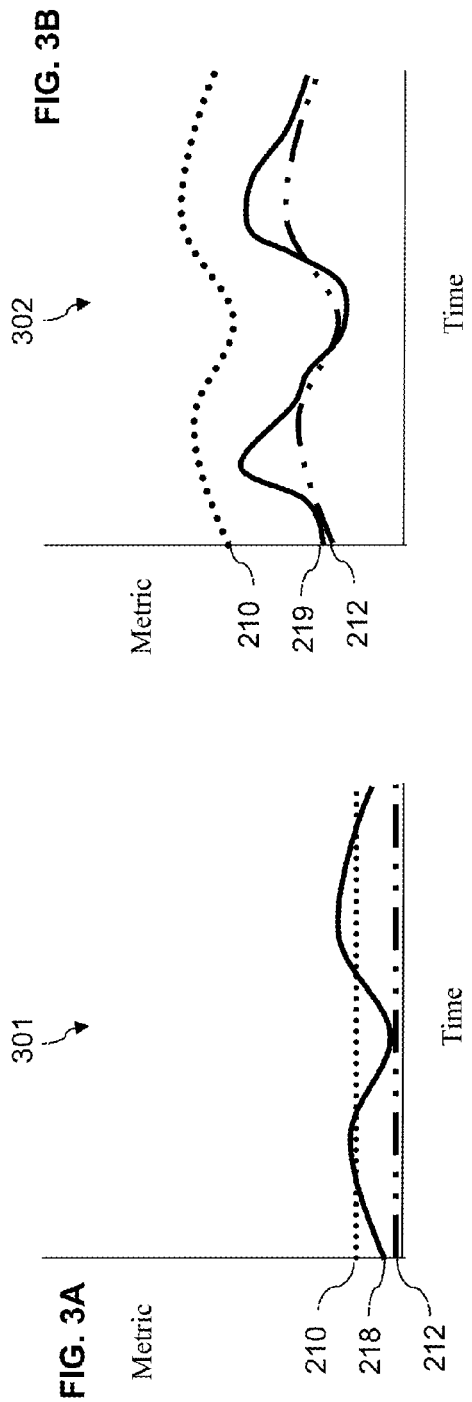
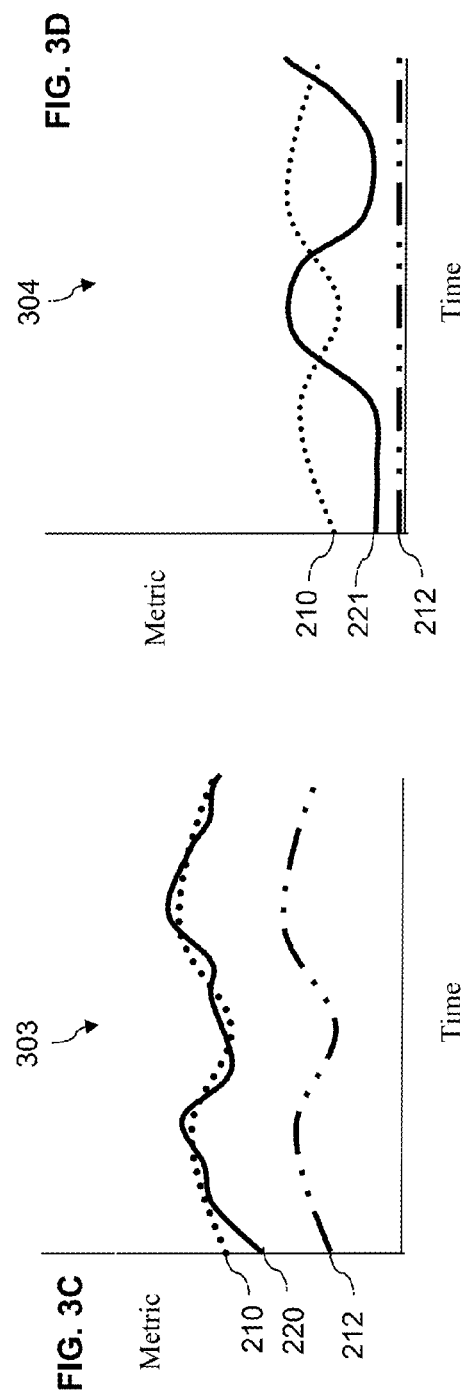

METHOD FOR QUALITATIVE ANALYSIS OF SYSTEM PERFORMANCE CORRELATION FACTORS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A service provider may operate telecommunications equipment configured to provide communication service to one or more end users. The service provider may allocate common resources of the service provider's telecommunications equipment to a particular end user while other common resources may be assigned to other end users. The resources allocated by the service provider to end user may be configured at the service provider's side in accordance with an agreement between the service provider and the end user based on a communication service requested by the end user. The end user's equipment may be configured in accordance with an agreement for interfacing with the service provider's equipment to allow access to the communication service.

The service provider's equipment may comprise a plurality of servers. Periodically, these servers may malfunction or have some problem that produces a negative effect on the communication service provided to the end user. End users may contact the service provider to indicate a problem with the communication service provided by the service provider, and the service provider may issue a trouble ticket in response to the end user complaint. Maintenance may be performed on the malfunctioning servers in order to restore satisfactory service.

SUMMARY

In an embodiment, a method of maintaining server performance is disclosed. The method comprises receiving, at an analysis server, server performance metrics from at least one monitored server, wherein server performance metrics comprise information about processor usage, memory usage, and network activity and comparing the received server performance metrics with a baseline of values that was established for the server performance metrics based on a variance analysis of historical values. The method further comprises determining that the value of at least one server performance metric of the monitored server is consistently above an upper limit of a range of acceptable deviation from the baseline, analyzing historical occurrences of similar departures of server performance metrics from the range of acceptable deviation, and generating an alert indicating that a risk pattern has been identified and suggesting shutting down a locked process on the monitored server in order to return the server performance metrics to values within the range of acceptable deviation.

In an embodiment, a method of maintaining server performance is disclosed. The method comprises retrieving, by an analysis server, server performance metrics information of at least one monitored server from a data store, wherein server performance metrics information comprises information about processor usage, memory usage, and network activity and comparing the retrieved server performance metrics information with a baseline of acceptable values that was established for the server performance metrics based on a variance analysis of historical values. The method further comprises determining that the value of at least one server performance metric of the monitored server is below the lower limit of a range of acceptable deviation from the baseline and indicates a reduction in workload compared to historical workloads, analyzing historical departures of the server performance metrics from the range of acceptable deviation that are within a predefined range of similarity to the current departure, and generating an alert that is configured to indicate that a risk pattern has been identified.

In an embodiment, a method resolving anomalies on a server is disclosed. The method comprises measuring current values of a set of server performance metrics, mapping the current values of the server performance metrics against historical values of the server performance metrics, determining if any anomalies exist in the current values of the server performance metrics, tracking measurements of the values of the server performance metrics during the anomalies when they exist, and identifying a resolution used to resolve the anomalies. The method further comprises determining minimum and maximum values to define the anomalies, identifying when a measurement of the server performance metrics yields a value outside of a range of values bounded by the minimum value and the maximum value, matching a pattern to the measurement, and applying the resolution based on the matching.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2A is an illustration of a trace of server metrics over time according to an embodiment of the disclosure.

FIG. 2B is an illustration of a trace of server metrics over time according to an embodiment of the disclosure.

FIG. 2C is an illustration of a trace of server metrics over time according to an embodiment of the disclosure.

FIG. 2D is an illustration of a trace of server metrics over time according to an embodiment of the disclosure.

FIG. 3A is an illustration of a trace of server metrics over time according to an embodiment of the disclosure.

FIG. 3B is an illustration of a trace of server metrics over time according to an embodiment of the disclosure.

FIG. 3C is an illustration of a trace of server metrics over time according to an embodiment of the disclosure.

FIG. 3D is an illustration of a trace of server metrics over time according to an embodiment of the disclosure.

DETAILED DESCRIPTION

Figure 1:
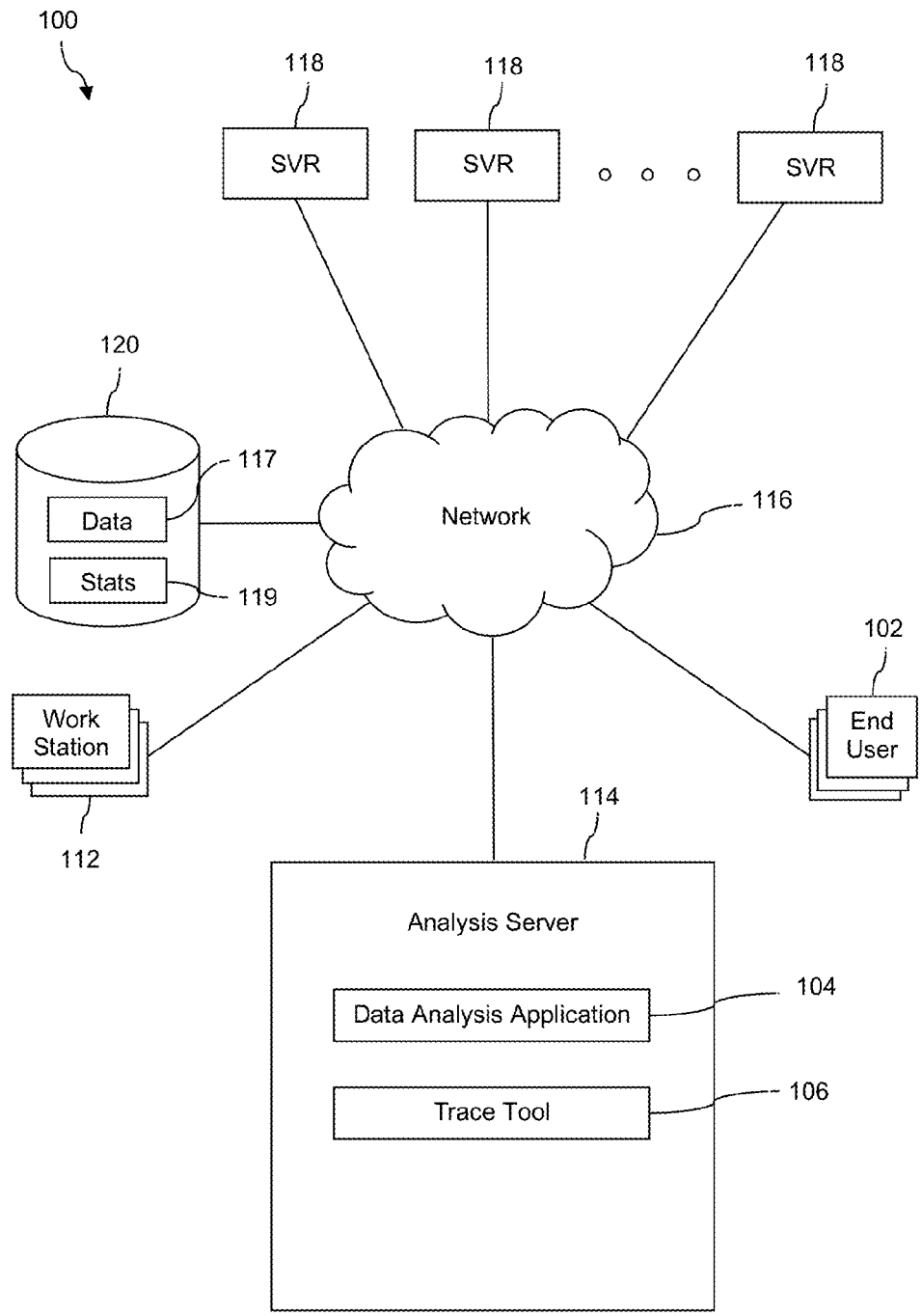
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Businesses, organizations, enterprises, and/or other entities may operate one or more servers configured to provide service to one or more end users. It is sometimes the case that one or more of the servers may experience a reduction in ability to provide service to the end users for some reason. A reduction in ability to provide service may have a negative effect on the experience of the end users served by the affected servers. End users may provide feedback that indicates a problem associated with the service provided by the servers in response to a reduction in server performance. Traditionally, it has been difficult to detect potential server problems that may result in reduced server performance until after end users have suffered a negative experience and provided feedback.

The present disclosure teaches a method of proactively identifying potential server problems based on historical server performance. The method may be performed on monitored servers that provide service to end users and/or the method may be performed on a central server configured to analyze server performance metrics for one or more servers that provide service to end users. For the purposes of this disclosure, the servers whose performance is being monitored will be referred to as "monitored servers," and servers configured to analyze server performance metrics will be referred to as "analysis servers." In some cases, a server being monitored may act as its own analysis server.

In an embodiment, a monitored server may track and/or record data about one or more server performance metrics such as processor usage, memory usage, and network activity. The data may be stored in an online data store accessible by an analysis server, or the data may be sent to the analysis server directly. A baseline of acceptable server performance for each hour of each day of the week may be established based on historical values of the server performance metrics of the monitored server during periods of acceptable server performance, and a range of acceptable deviation from the baseline may be defined in order to reduce false alerts resulting from a server performance metric reaching a value that has a low risk of resulting in the monitored server experiencing reduced server performance but that is outside of the range of acceptable deviation for that hour of that day of the week. In some cases, there may be a separate baseline established for each recorded server performance metric. The baseline may be updated at the end of each day with server performance metrics data from the previous twenty-four hours. Thus, the baseline may be always up to date for a current hour.

The baseline and range of acceptable deviation may serve to define a range of server performance metric values that don't typically result in the monitored server experiencing reduced server performance that has negative effects for end users. An alert may be triggered when a server performance metric of the monitored server reaches a value outside of the range of acceptable deviation. The analysis server may track and record situations in which server performance metrics of the monitored server reach a value outside of the range of acceptable deviation and may record the result of those situations. Records of such situations may be stored as maps, graphs, or traces of server performance metric values in relation to the range of acceptable deviation. Alternatively, records of such situations may be stored as a list of server performance metrics values that were reached.

For example, a server performance metric of the monitored server may reach a value outside of the range of acceptable deviation, and the analysis server may record the values of the server performance metric from a predefined time before the server performance metric escaped the range of acceptable deviation until after normal server function of the monitored server has been restored. In one case, the result of the situation above may have been that a locked process was running on the monitored server and was shut down in order to restore normal server function of the monitored server. This result may be recorded and associated with the record of the situation.

Situations in which a server performance metric of the monitored server reaches a value outside of the range of acceptable deviation may be evaluated against historical records of situations within a predefined degree of similarity. It may be the case that similar historical situations had a high probability of resulting in end user feedback that indicated a problem with the monitored server. In the case above, an alert with a high priority may be triggered to indicate a high risk situation. Alternatively, a low priority alert may be triggered if it is the case that similar historical situations rarely resulted in end user feedback that indicated a problem with the monitored server. The alerts may be ranked in a queue according to priority, wherein higher priority alerts may be addressed before lower priority alerts.

In some cases, an alert may be configured to indicate not only the risk of negative end user impact of a situation but also to indicate a possible solution. The possible solution may be identified based on an analysis of solutions to historical situations within the predefined degree of similarity. For example, if the solution to a historical situation that was within the predefined range of similarity was to shut down a locked process on the monitored server, the alert may indicate shutting down a locked process on the monitored server as a possible solution.

It is anticipated that proactively identifying potential server problems on a monitored server based on historical server performance of the monitored server may improve server interactions for end users by identifying potential problem situations before they result in server performance problems for end users. For example, a current trend may be identified as similar to a historical trend that resulted in reduced server performance, and a problem situation may be remedied in response to the identification. In the example given, the problem situation may be addressed before receiving end user feedback indicating a problem with the server and may be addressed before end users detect a change in server performance.

Turning now to FIG. 1, a communication system 100 is described. In an embodiment, the communication system 100 comprises a plurality of monitored servers 118, a network 116, a data store 120, a plurality of end users 102, a plurality of work stations 112, and an analysis server 114. Though the communication system 100 is depicted in FIG. 1 as comprising a plurality of monitored servers 118, it should be understood that the communication system 100 may comprise a single monitored server 118 in some cases. The data store 120 may comprise server performance data 117 and server performance statistics 119. The analysis server 114 may comprise a data analysis application 104 and a trace tool 106. In some cases, the analysis server 114 may comprise other applications and/or other tools configured to track, record, and/or analyze information from the monitored servers 118. Though the communication system 100 is depicted as comprising a single analysis server 114, it is contemplated that some embodiments of the present disclosure may comprise a plurality of analysis servers 114.

In an embodiment, the monitored servers 118 may comprise one or more application servers, catalog servers, communication servers, database servers, fax servers, file servers, game servers, home servers, mobile servers, proxy servers, sound servers, web servers, and/or one or more other servers configured to provide service to the end users 102. As described above, in some cases, the monitored servers 118 may perform substantially similar operations as the analysis server 114 discussed in greater detail below. The monitored servers 118 may be configured to track and/or record their server performance information which may include information about processor usage, information about memory usage, information about network activity, and/or other information. The term "server performance metrics" will be used hereinafter to describe measurable characteristics of server performance such as processor usage, memory usage, network activity, and other characteristics. Server performance information and/or information about server performance metrics may comprise information about workloads, time of day, and the date.

In an embodiment, the monitored servers 118 may provide services to the end users 102. For example, the monitored servers 118 may provide web page services, electronic mail services, file services, and/or other services to the end users 102. The performance of the monitored servers 118 may not be constant. In some circumstances, the monitored servers 118 may provide rapid service to the end users 102, and in other circumstances, the monitored servers 118 may provide slower service to the end users 102. In cases of slow service, the end users 102 may lodge a complaint with the operator of the monitored servers 118, wherein the complaint indicates a problem with the service provided by the monitored servers 118, a problem with the monitored servers 118 themselves, and/or indicates some other issue.

The performance of the monitored servers 118 may refer to and/or be measured as the speed at which the monitored servers 118 provide service, the accuracy of the service provided, the quality of the service provided, or performance may refer to and/or measured as something else. Acceptable server performance may refer to performance of the monitored servers 118 that meets a defined standard of service, performance that results in no negative feedback from the end users 102, performance that results in less than some threshold of negative feedback from the end users 102, or acceptable server performance may refer to something else. Poor performance, unacceptable performance, etc., may refer to performance that does not meet defined performance standards and/or performance that exceeds a threshold of negative feedback from the end users 102. Normal server performance may refer to acceptable server performance, to performance within a range of historical performance, to expected server performance, or to something else.

Performance of the monitored servers 118 may be variable for a variety of reasons. The performance of the monitored servers 118 may be wholly or partially dependent on workload, integrity of hardware, integrity of software, resource availability, resource capacity, or on something else. It may be that the performance of the monitored servers 118 may be anticipated by analyzing server performance information including server performance metrics such as processor usage, memory usage, and network activity.

For example, an increase in workload that occurs while the processor usage of the monitored servers 118 is above ninety percent may cause the monitored servers 118 to be overloaded and thus reduce performance of the monitored servers 118 by slowing the delivery of services to the end users 102. Thus, in some cases, one may anticipate reduced performance of the monitored servers 118 when the processor usage of the monitored servers 118 exceeds ninety percent. Conversely, normal performance may be anticipated if the server performance metrics are not approaching their maximum capacity because server performance metrics that are not approaching maximum capacity may have a low risk of resulting in reduced server performance. This may be because, in some cases, the performance of the monitored servers 118 may be substantially similar regardless of the values of the server performance metrics when the values of the server performance metrics are within a certain range.

Identifying conditions, states, problems, situations, and/or server performance metrics values that may result in reduced server performance of the monitored servers 118 before reduced server performance manifests itself to such a degree that the end users 102 lodge complaints about the performance of the monitored servers 118 may be beneficial to a service provider, to an operator of the monitored servers 118, to an operator of the workstation 112, and/or to the end users 102. The monitored servers 118 may comprise a monitor and/or a monitor application configured to track and/or record information about the monitored servers 118 including, but not limited to, server performance information, information about server performance metrics, workloads, time periods, and/or other information. The monitored servers 118 may be configured to submit the server performance information, such as information about server performance metrics, for analysis. The server performance information may be analyzed to assess the risk of reduced server performance given the current operating state of the monitored servers 118 and actions may be taken based on the assessment of risk.

In an embodiment, the monitored servers 118 may store server performance information, such as information about server performance metrics, as server performance data 117 in the data store 120. The server performance information may comprise measurements of the server performance metrics, wherein the measurements of the server performance metrics may comprise a percentage of resource usage, a rate of resource usage, a measurement of component speed, a measurement of resource activity, or some other measurement.

The monitored servers 118 may be configured to record server performance information continuously or at predetermined intervals such as every minute, every five minutes, every ten minutes, every thirty minutes, every hour, every six hours, every day, or some other interval. In some cases, the monitored servers 118 may be configured to record server performance information in real time. Recording the server performance information in real time may comprise recording the server performance information continuously, about every second, about every five seconds, about every ten seconds, or recording the server performance information in real time may comprise recording the server performance information within some other timeframe. The monitored servers 118 may store the recorded information in the data store 120 at substantially similar intervals, continuously, or at different intervals. Recording server performance information may comprise calculating the values of the server performance metrics, and in some cases, recording server performance information may comprise storing the performance information in the data store 120 and may be considered substantially similar.

Alternatively, the monitored servers 118 may send server performance information directly to the analysis server 114. The monitored servers 118 may be configured to send the performance information to the analysis server 114 continuously, at predetermined intervals, or in real time as described above with reference to sending performance information to the data store 120. In some cases, the monitored servers 118 may both store the server performance information in the data store 120 and send the server performance information to the analysis server 114. The monitored servers 118 may store the server performance information in the data store 120 before sending it to the analysis server 114, the monitored servers 118 may send the server performance information to the analysis server 114 before storing it in the data store 120, or the monitored servers 118 may send the server performance information to the data store 120 and the analysis server 114 at the same time.

The analysis server 114 may receive the server performance information directly from the monitored servers 118 as described above, or the analysis server 114 may retrieve the server performance information from the data store 120 where the server performance information may be stored as the server performance data 117. In some cases, the analysis server 114 may be configured to store server performance information received from the monitored servers 118 as server performance data 117 in the data store 120. The analysis server 114 may invoke the data analysis application 104 to analyze the server performance information in order to generate server performance statistics that may be stored in the data store 120 as the server performance statistics 119.

In an embodiment, the server performance data 117 may comprise information about feedback from the end users 102, information about workloads, information about server performance metrics, information about time of day, information about dates, and/or other information. The analysis server 114 may compile the server performance statistics 119 by analyzing the server performance data 117. Server performance statistics 119 stored in the data store 120 by the analysis server 114 may comprise statistics relating to the workload of each of the monitored servers 118, statistics relating to the values of the server performance metrics of each of the monitored servers 118, statistics relating to the performance of each of the monitored servers 118 at a given time of day, day of the week, and/or date, and/or the server performance statistics 119 may comprise other statistics.

For example, the server performance statistics 119 may show that, statistically speaking, the workload on the monitored servers 118 is typically higher on Mondays at 9:30 am than it is on Fridays at 5:00 am. In another example, the server performance statistics 119 may show that, statistically speaking, the end users 102 rarely provide feedback indicating a problem with the monitored servers 118 when the server performance metrics are within a certain range. In an embodiment, the server performance statistics 119 may provide insight into server performance and/or activity during each hour of the day on each day of the week and may further provide insight into server performance and/or activity for the time of day and day of the week for different dates. For example, the server performance statistics 119 may show that, statistically speaking, the monitored servers 118 are more active at 11:00 am on December $25^{th}$ when December $25^{th}$ falls on a Wednesday than when December $25^{th}$ falls on a Saturday.

In an embodiment, a baseline of server performance may be established based on historical server performance. There may be a separate baseline established for each of the monitored servers 118. The baseline may be established by the analysis server 114, by an operator of the work stations 112, or by something else. In some cases, multiple baselines may be established, wherein different baselines correspond to different aspects of server performance. For example, there may be a separate baseline established for each of the server performance metrics. Herein below, "the baseline" may refer to a single baseline, a baseline configured to represent multiple aspects of server performance, or to multiple baselines. The baseline may be established for various time periods. For example, the baseline may be established for each hour of each day of the week, for each date within the year, and/or for each month of the year, though other time periods are also possible (e.g., work hours, nighttime, etc.).

The baseline may be established by calculating the historical average value of the server performance metrics extending back a predefined amount of time. Alternatively, the baseline may be established by performing a variance analysis of historical server performance metrics extending back a predefined amount of time. For example, the average value of processor usage between 9:00 am and 9:59 am on Mondays may be 75%, and this value may be calculated by averaging the processor usage value between 9:00 am and 9:59 am on Mondays extending back one day, one week, one month, two months, three months, six months, a year, two years, or some other amount of time. In an embodiment, only periods of acceptable server performance may be included when calculating the baseline, and periods of server performance marred by feedback that indicates a reduction in server performance may be excluded from the calculations. For example, outliers may be excluded from the data set used to generate the baseline(s).

The baseline may be updated and/or recalculated continuously, in real time, every hour, every day, every week, once a month, once a year, or after some other period of time. In some cases, the baseline may be kept always up to date. For example, updating and/or recalculating the baseline for each hour of a given day at the end of that day will leave the baseline up to date for each hour of the day on the same day the next week. Thus, the baseline may be considered up to date for that day. In some cases, the baseline may be kept always up to date and be updated on a different interval. For example, if the server performance information for each day of a week is factored into the baseline on the last hour of that week, then the baseline may be considered up to date for each hour of each day of the next week. Thus, when the baseline is updated as described, the baseline may be always up to date for a current hour and current day of the week.

The baseline may serve to provide a base value for server performance metrics during periods of acceptable server performance. A range of acceptable deviation from the baseline may be established by the analysis server 114, by an operator of the work stations 112, or by something else. The range of acceptable deviation may be established in order to provide some flexibility in the range of acceptable values that the server performance metrics may reach without triggering an alert which is described in greater detail herein below. The range of acceptable deviation may be defined and/or otherwise determined based on the server performance statistics 119. The range of acceptable deviation may be set with the goal of preventing false positives resulting from server performance metrics that have little risk of being associated with reduced server performance reaching a value outside of the range of acceptable deviation and triggering an alert.

The range of acceptable deviation may comprise an upper limit and a lower limit that may be calculated as a number of standard deviations from the baseline, as a set number, as a percentage deviation from the baseline, or as some other number. For example, the range of acceptable deviation may be bounded by upper and lower limits that are one standard deviation from the baseline, two standard deviations from the baseline, three standard deviations from the baseline, four standard deviations from the baseline, five standard deviations from the baseline, or some that are different from the baseline in some other capacity. Alternatively, the range of acceptable deviation may be bounded by upper and lower limits that have a 10 percent difference from the baseline, a 20 percent difference from the baseline, a 30 percent difference from the baseline, a 40 percent difference from the baseline, a 50 percent difference from the baseline, a 100 percent difference from the baseline, or that differ from the baseline in some other capacity. In some cases, the range of acceptable deviation may be the baseline values with no deviation.

In an embodiment, the range of acceptable deviation may be small if the consequences of missing an indication of potential reduced server performance are severe. For example, communication systems 100 being implemented in the medical field may have relatively small ranges of acceptable deviation in order to provide a high level of confidence that monitored servers 118 functioning within the range of acceptable deviation have a low risk of experiencing reduced server performance. Low risk and/or low probability of experiencing reduced server performance may be less than about 20 percent chance of experiencing reduced server performance, less than about 10 percent chance of experiencing reduced server performance, less than about 5 percent chance of experiencing reduced server performance, less than about 2 percent chance of experiencing reduced server performance, less than about 1 percent chance of experiencing reduced server performance, zero percent chance of experiencing reduced server performance, or some probability of experiencing reduced server performance. Alternatively, in some cases, the range of acceptable deviation may be large in order to reduce false positives. For example, too many false positives may become a problem if the communication system 100 comprises 3,000 monitored servers 118 and the range of acceptable deviation is small.

In an embodiment, the analysis server 114 may be configured to analyze server performance information of the monitored servers 118, wherein analyzing server performance information may comprise invoking the data analysis application 104 and may comprise comparing the server performance information to the server performance data 117 and/or to the server performance statistics 119 stored in the data store 120. The analysis server 114 may be configured to perform the analysis continuously as it receives the server performance information from the monitored servers 118, the analysis server 114 may be configured to perform the analysis continuously as it continuously retrieves the server performance information from the data store 120, or the analysis server 114 may be configured to perform the analysis at predefined intervals such as every second, every two seconds, every minute, every five minutes, every ten minutes, every hour, every two hours, every six hours, every day, or at some other interval.

In some cases, the analysis server 114 may perform the analysis in real time. Performing the analysis in real time may comprise performing the analysis continuously as server performance information changes on the monitored servers 118, within about one second of server performance information changes on the monitored servers 118, within about two seconds of server performance information changes on the monitored servers 118, within about five seconds of server performance information changes on the monitored servers 118, within about ten seconds of server performance information changes on the monitored servers 118, or within some other time frame of server performance information changes on the monitored servers 118.

The analysis server 114 may determine whether or not the monitored servers 118 are operating within the range of acceptable deviation from the baseline. When the monitored servers 118 are operating within the range of acceptable deviation, the analysis server 114 may allow the monitored servers 118 to continue to operate without taking further action. If, however, the analysis server 114 determines that one or more of the monitored servers 118 are operating outside the range of acceptable deviation, then the analysis server 114 may analyze recent and/or current server performance information of the monitored servers 118 in question in view of historical server performance information that similarly exceeded and/or departed from the range of acceptable deviation and/or to server performance statistics stored in the data store 120.

The analysis server 114 may be configured to analyze historical server performance periods within a predefined degree of similarity to the current server performance. In an embodiment, the predefined degree or range of similarity may be about 50% similar, about 60% similar, about 70% similar, about 75% similar, about 80% similar, about 85% similar, about 90% similar, about 95% similar, about 98% similar, about 99% similar, exactly the same, or some other degree of similarity.

The analysis may yield data about the frequency of reduced server performance in similar historical situations, data about end user feedback in similar historical situations, data about how similar historical situations were resolved, and/or other data. The analysis server 114 may determine, based on the analysis, the risk that the monitored servers 118 in question have of experiencing reduced server performance while they are operating outside of the range of acceptable deviation. For example, if historically speaking, every incidence of the monitored servers 118 operating with a certain pattern of server performance metrics values resulted in reduced server performance and a high number of complaints from the end users 102, then the risk of reduced server performance and negative feedback may be high.

In an embodiment, the analysis server 114 may determine the risk of reduced server performance by analyzing the values of more than one server performance metric compared to the baseline. For example, the analysis server 114 may analyze processor usage, memory usage, and network activity compared to their respective baseline. It may be determined that some set of server performance metrics have reached values outside of the range of acceptable deviation. If that is the case, then the analysis server 114 may analyze historically similar situations with similar server performance metrics data.

In some cases, the risk posed by an individual server performance metric outside of the range of acceptable deviation may be partially dependent on the values of other server performance metrics. For example, if all of the tracked server performance metrics are just above the range of acceptable deviation, there may be a low risk of reduced server performance since the server may be experiencing a slight increase in workload but is otherwise functioning normally. Alternatively, if only one server performance metric is outside the range of acceptable deviation, there may be an elevated risk of reduced server performance since that may indicate some problem with server function. If there is a low risk of reduced server performance, the monitored servers 118 may be allowed to continue to function normally.

In an embodiment, the analysis server 114 may determine the risk of reduced server performance by analyzing server performance across multiple monitored servers 118. In some cases, the risk posed by server performance metrics outside of the range of acceptable deviation may be partially dependent on the performance of other monitored servers 118. For example, if only one monitored server 118 is operating with server performance metrics outside the range of acceptable deviation, there may be high risk of reduced server performance from that server since the server appears to be functioning abnormally compared to other monitored servers 118. Alternatively, if all of the monitored servers 118 are operating with server performance metrics that are similarly outside of the range of acceptable deviation, the deviations may be a sign of increased server activity and there may be a low risk of reduced server performance. Thus, the risk of reduced server performance posed by server performance metrics outside the range of acceptable deviation may detected based on the amount of monitored servers 118 operating outside the range of acceptable deviation.

The analysis server 114 may be configured to send or trigger an alert to the work station 112 when one or more of the monitored servers 118 are operating outside the range of acceptable deviation. In an embodiment, the work station 112 may comprise a control desk capable of altering the performance and/or configuration of the monitored servers 118. The alert may be triggered and/or sent anytime the server performance metrics reach a value outside the range of acceptable deviation, when the server performance metrics are steadily at a value outside the range of acceptable deviation, when historically similar situations are associated with a high risk of reduced server performance and/or end user feedback that indicates a problem with the performance of the monitored servers 118, or at some other time.

In an embodiment, the alert may comprise a message configured to provide information about the state of the monitored servers 118, information about the risk of reduced performance of the monitored servers 118, information about the probability of problem situations on the monitored servers 118, information about similar historical situations, information about possible actions that may be taken to return the server performance metrics of the monitored servers 118 to values within the range of acceptable deviation, or information about something else. For example, the alert may comprise a message that indicates that there is a high risk and/or a high probability that the monitored servers 118 may suffer reduced server performance due to processor usage being consistently above the range of acceptable deviation, and the alert may indicate that a possible action to return processor usage to a value within the range of acceptable deviation may comprise shutting down a locked process on the monitored servers 118.

The alert may have an assigned urgency value based on the identified risk of reduced server performance. In some cases, the alert may be configured to indicate the risk of reduced server performance. The urgency value may be assigned by the analysis server 114, or the urgency value may be assigned in a queue of the work station 112. Alerts for higher risk situations on the monitored servers 118 may be assigned greater urgency values, wherein greater urgency values may be addressed sooner than lesser urgency values.

For example, a complete loss of processor usage may be associated with a high risk of reduced server performance and may be assigned a higher urgency value than a pattern of processor usage that is associated with a low risk of reduced server performance. In another example, the server performance metrics that are consistently above the range of acceptable deviation may be assigned a higher urgency value than server performance metrics that reach values outside the range of acceptable deviation due to a time shift because server performance metrics that are consistently above the range of acceptable deviation may have a higher risk of resulting in reduced server performance.

In an embodiment, the work station 112 may request a trace, a map, and/or a graph of the server performance metrics from the analysis server 114. In some cases, traces, maps, and graphs of server performance metrics may be substantially similar. For the sake of brevity, the term trace will be used hereinafter. The analysis server 114 may invoke the trace tool 106 in order to generate one or more traces of a requested time frame of server performance and/or of similar historical server performance. For example, the analysis server may generate a trace for server performance extending back six hours and may send the trace to the work station 112. Traces may show server performance metrics values compared to the baseline and/or to the range of acceptable deviation. In some cases, traces may be sent to the work station 112 along with the alert. The analysis server 114 may be configured to store and/or recall traces from the data store 120. In some circumstances, traces may be analyzed by the analysis server 114 in order to determine the risk of reduced server performance as described above.

The work station 112 may have the capability to alter the monitored servers 118. Thus, the work station 112 may have the ability to resolve situations that may result in reduced server performance. It is anticipated that information provided by the analysis server 114 may assist the work station 112 and/or an operator of the workstation 112 in identifying a course of action that may return server performance metrics to values within the range of acceptable deviation and/or reduce the risk of reduced server performance of the monitored servers 118.

Several traces of server performance will be discussed herein below. With reference to the traces, the limits of the range of acceptable deviation for a trace may be set at different values than the limits of the range of acceptable deviation for a different trace. Alternatively, the limits of the range of acceptable deviation may be set at the same values in different traces. The traces may be used to show the relation of server performance metrics values to the range of acceptable deviation. As used herein, a "normal" usage refers to one in which the server performance metric is within the range of the acceptable deviation. In some cases, server performance metrics values with similar relations to the range of acceptable deviation may be considered similar regardless of where the limits of the range of acceptable deviation are set in each case. For example, two traces showing server performance metrics values that are consistently above the upper limit of the range of acceptable deviation may be considered similar even if the upper limit of the range of acceptable deviation is set at a different value in each trace. Alternatively, in some cases, the values at which the limits of the range of acceptable deviation are set may play a role in the assessment of server performance patterns.

With reference to the traces herein below, amplitude may be a measure of how active a server performance metric is and magnitude may be the length of time a server performance metric is active. The traces below measure server performance metric values on the Y axis and time on the X axis. The server performance metric values may be measured as percentages or as something else. The measure of time on the Y axis may be hours of the day. For example, times closer to the origin may be earlier in the day, i.e., 1:00 am may be closer to the origin than 3:00 am.

Turning now to FIG. 2A, a trace 201 of server performance metrics over time is disclosed. In an embodiment, the trace 201 may be generated by the analysis server 114 as described hereinabove with reference to FIG. 1. In an embodiment, the trace 201 may comprise server performance metrics values 214, an upper limit of the range of acceptable deviation 210, and a lower limit of the range of acceptable deviation 212. In an embodiment, the server performance metric values 214 may be a measure of the CPU usage of a given server, which may be expressed as a percentage of a maximum or available usage. The trace 201 depicts the server performance metrics values 214 as being consistently above the upper limit of the range of acceptable deviation 210. A server trace in which the server performance metric (e.g., the CPU usage) demonstrates a sustained increase in amplitude may be referred to as a highlander pattern in some contexts. Server performance following a pattern similar to that shown in the trace 201 may result from a code change, a sudden workload increase, from a locked process, an abnormal run condition, or from something else. The server performance metrics values 214 may be returned to values within the range of acceptable deviation by shutting down the locked process or by addressing other potential reasons for the server performance pattern. The server performance pattern depicted in the trace 201 may have a high risk of resulting in reduced server performance and/or end user feedback that indicates a problem with the server.

Turning now to FIG. 2B, a trace 202 of server performance metrics over time is disclosed. In an embodiment, the trace 202 may be generated by the analysis server 114 as described hereinabove with reference to FIG. 1. In an embodiment, the trace 202 may comprise server performance metrics values 215, the upper limit of the range of acceptable deviation 210, and the lower limit of the range of acceptable deviation 212. In an embodiment, the server performance metric values 215 may be a measure of the CPU usage of a given server, which may be expressed as a percentage of a maximum or available usage. The trace 202 depicts the server performance metrics values 215 as having an amplitude and magnitude that generally falls within the range of acceptable deviation, i.e. the amplitude and magnitude are generally normal, but the server performance metrics values 215 frequently and intermittently experience drops in amplitude that fall below the lower limit of the range of acceptable deviation 212. A server trace in which the server performance metric (e.g., the CPU usage) demonstrates frequent and intermittent decreases in amplitude may be referred to as a dipping pattern in some contexts.

Server performance following a pattern similar to that shown in the trace 202 may result from intermittent upstream and/or downstream resource availability, for example from intermittent loss of resource availability, or from something else. The server performance metrics values 215 may be returned to values within the range of acceptable deviation by addressing problems of resource availability. The server performance pattern depicted in the trace 202 may have a moderate to high risk of being associated with reduced server performance and/or end user feedback that indicates a problem with the server.

Turning now to FIG. 2C, a trace 203 of server performance metrics over time is disclosed. In an embodiment, the trace 203 may be generated by the analysis server 114 as described hereinabove with reference to FIG. 1. In an embodiment, the trace 203 may comprise server performance metrics values 216, the upper limit of the range of acceptable deviation 210, and the lower limit of the range of acceptable deviation 212. In an embodiment, the server performance metric values 216 may be a measure of the CPU usage of a given server, which may be expressed as a percentage of a maximum or available usage. The trace 203 depicts the server performance metrics values 216 peaking at abnormal intervals along with intermittent amplitude variance. The trace 203 depicts the server performance metrics values 216 as intermittently spiking to values above the upper limit of the range of acceptable deviation 210. A server trace in which the server performance metric (e.g., the CPU usage) demonstrates metrics peaking at abnormal intervals along with intermittent amplitude variance may be referred to as a spiking pattern in some contexts.

Server performance following a pattern similar to that shown in the trace 203 may result from a change in system management, a new workload introduction, or from something else. The server performance metrics values 216 may be returned to values within the range of acceptable deviation by addressing likely causes of the pattern. The server performance pattern depicted in the trace 203 may have a moderate risk of being associated with reduced server performance and/or end user feedback that indicates a problem with the server.

Turning now to FIG. 2D, a trace 204 of server performance metrics over time is disclosed. In an embodiment, the trace 204 may be generated by the analysis server 114 as described hereinabove with reference to FIG. 1. In an embodiment, the trace 204 may comprise server performance metrics values 217, the upper limit of the range of acceptable deviation 210, and the lower limit of the range of acceptable deviation 212. In an embodiment, the server performance metric values 217 may be a measure of the CPU usage of a given server, which may be expressed as a percentage of a maximum or available usage. The trace 204 depicts the server performance metrics values 217 as showing a reduction in workload or a halt in workload based on normal observed workload activity. A server trace in which the server performance metric (e.g., the CPU usage) demonstrates a reduction or halt in workload may be referred to as a flatlander pattern in some contexts. Server performance following a pattern similar to that shown in the trace 204 may result from a transitional workload, from a load balancer failure (e.g., assigning work to another server rather than distributing the workload), or from something else. The server performance metrics values 217 may be returned to values within the range of acceptable deviation by addressing load balancer issues, workload issues, or other causes for the pattern of performance. The server performance pattern depicted in the trace 204 may have a moderate risk or high risk of being associated with reduced server performance and/or end user feedback that indicates a problem with the server.

Turning now to FIG. 3A, a trace 301 of server performance metrics over time is disclosed. In an embodiment, the trace 301 may be generated by the analysis server 114 as described hereinabove with reference to FIG. 1. In an embodiment, the trace 301 may comprise server performance metrics values 218, the upper limit of the range of acceptable deviation 210, and the lower limit of the range of acceptable deviation 212. In an embodiment, the server performance metric values 218 may be a measure of the CPU usage of a given server, which may be expressed as a percentage of a maximum or available usage. The server performance pattern depicted in the trace 301 may be consistent with a server just beginning to process a production workload. The trace 301 depicts the server performance metrics values 218 as peaking to values at or above the upper limit of the range of acceptable deviation 210 at times consistent with the times that server usage may be expected to peak during a work day. A server trace in which the server performance metric (e.g., the CPU usage) has an amplitude and magnitude change consistent with a system at or near the beginning of the processing of a production workload may be referred to as a waverunner pattern in some contexts.

Server performance following a pattern similar to that shown in the trace 301 may result from a server just beginning to process a production workload, a change in end user demand, a change in workload, or from something else. The server performance pattern depicted in the trace 301 may have a low risk of being associated with reduced server performance and/or end user feedback that indicates a problem with the server. If the server performance metrics values 218 are reaching values outside of the range of acceptable deviation due to the server just beginning to process a production workload, then the range of acceptable deviation may be adjusted to reflect the new workload and to return the server performance metrics values 218 to values within the range of acceptable deviation.

Turning now to FIG. 3B, a trace 302 of server performance metrics over time is disclosed. In an embodiment, the trace 302 may be generated by the analysis server 114 as described hereinabove with reference to FIG. 1. In an embodiment, the trace 302 may comprise server performance metrics values 219, the upper limit of the range of acceptable deviation 210, and the lower limit of the range of acceptable deviation 212. In an embodiment, the server performance metric values 219 may be a measure of the CPU usage of a given server, which may be expressed as a percentage of a maximum or available usage. The trace 302 depicts the server performance metrics values 219 as showing a decrease in amplitude while maintaining a normal magnitude. The decrease in the amplitude may occur near the upper limit 210. The trace 302 depicts the server performance metrics values 219 as tending toward the lower limit of the range of acceptable deviation 212 and periodically dipping below the lower limit of the range of acceptable deviation 212. A server trace in which the server performance metric (e.g., the CPU usage) has an amplitude decrease while maintaining a normal magnitude may be referred to as a low riding pattern in some contexts.

Server performance following a pattern similar to that shown in the trace 302 may result from a change in end user demand, a change in workload, a change in resource consumption by an application, a code change, or from something else. The server performance metrics values 219 may be returned to values within the range of acceptable deviation by addressing likely causes of the pattern. The server performance pattern depicted in the trace 302 may have a low risk of being associated with reduced server performance and/or end user feedback that indicates a problem with the server.

Turning now to FIG. 3C, a trace 303 of server performance metrics over time is disclosed. In an embodiment, the trace 303 may be generated by the analysis server 114 as described hereinabove with reference to FIG. 1. In an embodiment, the trace 303 may comprise server performance metrics values 220, the upper limit of the range of acceptable deviation 210, and the lower limit of the range of acceptable deviation 212. In an embodiment, the server performance metric values 220 may be a measure of the CPU usage of a given server, which may be expressed as a percentage of a maximum or available usage. The trace 303 depicts the server performance metrics values 220 as having increased amplitude near the upper limit 210 while maintaining similar magnitude. The trace 303 depicts the server performance metrics values 220 as closely following the upper limit 210 of the range of acceptable deviation 210 and periodically reaching values above the upper limit of the range of acceptable deviation 210. A server trace in which the server performance metric (e.g., the CPU usage) has an amplitude increase near the upper boundary while maintaining a normal magnitude may be referred to as a high riding pattern in some contexts.

Server performance following a pattern similar to that shown in the trace 303 may result from a change in end user demand, a change in workload, a change in resource consumption by an application, a code change, or from something else. The server performance metrics values 220 may be returned to values within the range of acceptable deviation by addressing likely causes of the pattern. In some cases, the limits of the range of acceptable deviation may be adjusted to reflect the new load on the server. The server performance pattern depicted in the trace 303 may have a low risk of being associated with reduced server performance and/or end user feedback that indicates a problem with the server.

Turning now to FIG. 3D, a trace 304 of server performance metrics over time is disclosed. In an embodiment, the trace 304 may be generated by the analysis server 114 as described hereinabove with reference to FIG. 1. In an embodiment, the trace 304 may comprise server performance metrics values 221, the upper limit of the range of acceptable deviation 210, and the lower limit of the range of acceptable deviation 212. In an embodiment, the server performance metric values 221 may be a measure of the CPU usage of a given server, which may be expressed as a percentage of a maximum or available usage. The trace 304 depicts the server performance metrics values 221 as having roughly the expected amplitude and magnitude but on a shifted time frame. For example, the upper limit of the range of acceptable deviation may reflect an expected amplitude of 25% processor usage at 11:00 AM and an expected amplitude of 15% processor usage at 12:00 PM, and the server performance metrics values 221 may reach an amplitude of around 25% processor usage at 12:00 PM and around 15% at 1:00 PM. Thus, the time frame of server performance may be said to have shifted. The trace 304 depicts the server performance metrics values 221 as exceeding the upper limit of the range of acceptable deviation 210 by peaking on a shifted time frame. A server trace in which the server performance metric (e.g., the CPU usage) has an amplitude and magnitude that is normal but shifted on a time basis may be referred to as a shifting pattern in some contexts.

Server performance following a pattern similar to that shown in the trace 304 may result from a change in timing of end user demand, a scheduling change of a batch workload, a daylight savings time change, or from something else. The server performance metrics values 221 may be returned to values within the range of acceptable deviation by adjusting the range of deviation to reflect a workload timing change. The server performance pattern depicted in the trace 304 may have a low risk of being associated with reduced server performance and/or end user feedback that indicates a problem with the server.

Figure 4:
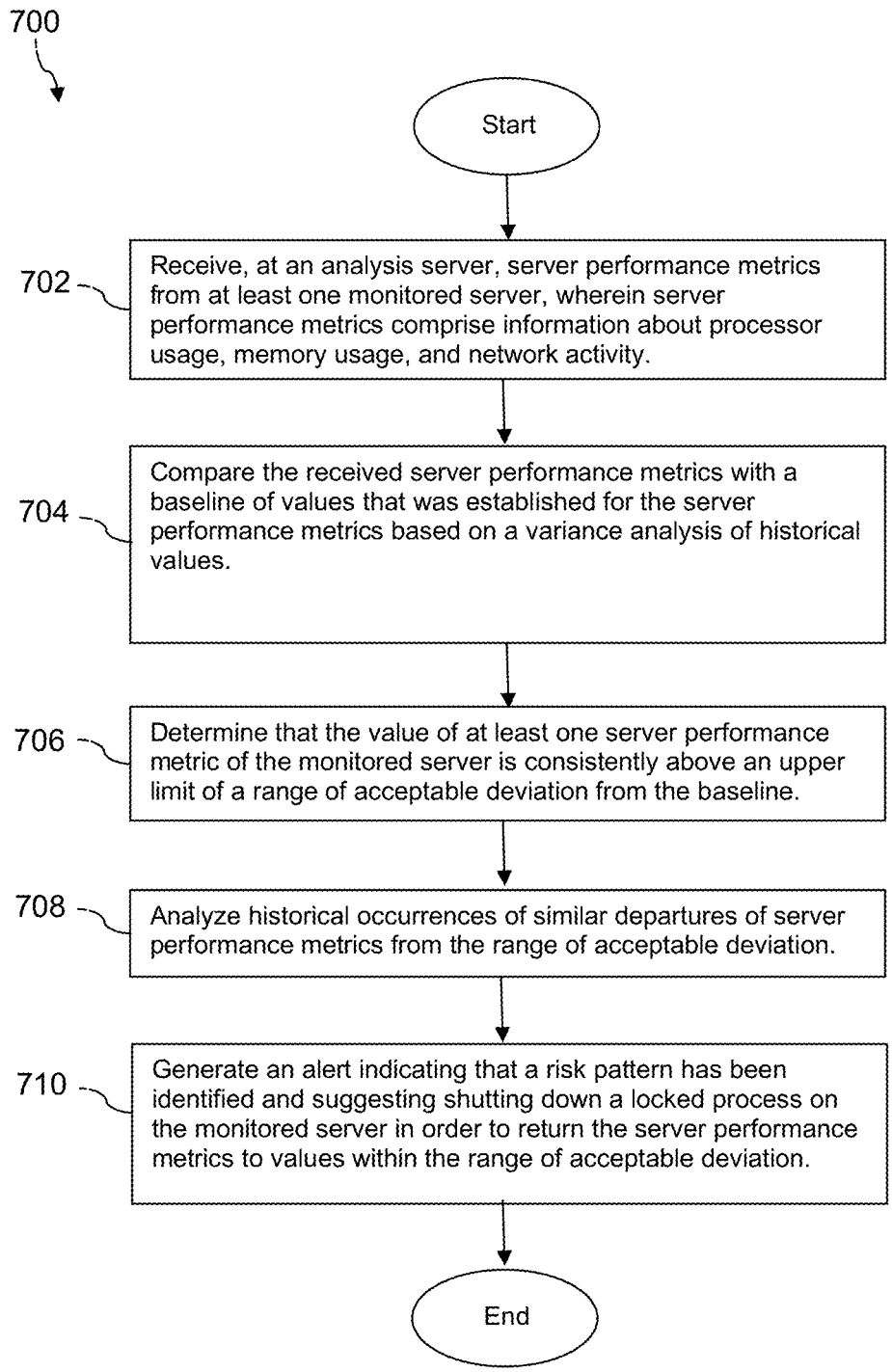
FIG. 4 is a flowchart of a method according to an embodiment of the disclosure.

Turning now to FIG. 4, a method 700 is described. In an embodiment, the method 700 may be performed by one or more components of the communication system 100 described with reference to FIG. 1. At block 702, server performance metrics may be received at an analysis server from at least one monitored server. The server performance metrics may be received in real time. Server performance metrics may comprise information about processor usage, memory usage, network activity, and/or information about something else. The received server performance metrics may be compared, at block 704, with a baseline of acceptable values that was established for the server performance metrics based on a variance analysis of the historical values. The variance analysis for historical values may be a variance analysis of historical values for each hour of each day of the week, of the one or more metrics of the monitored server during periods of acceptable server performance.

At block 706, the value of at least one server performance metric of the monitored server may be determined to be consistently above an upper limit of a range of acceptable deviation from the baseline. In some cases, a server performance metric that is consistently above the upper limit of the range of acceptable deviation may follow a similar server performance pattern to the server performance pattern described hereinabove with reference to FIG. 2A. Historical occurrences of similar departures of server performance metrics from the range of acceptable deviation may be analyzed at block 708.

At block 710, an alert may be generated. The alert may be sent to a work station. The alert may be configured to indicate that a risk pattern has been identified and that is further configured to suggest shutting down a locked process on the monitored server in order to return the server performance metrics to values within the range of acceptable deviation. In an embodiment, the suggestion to shut down the locked process may be based on a result of the analysis of historical occurrences that indicates that, historically, a locked process has been a reason for the server performance metrics to be consistently above the range of acceptable deviation.

Figure 5:
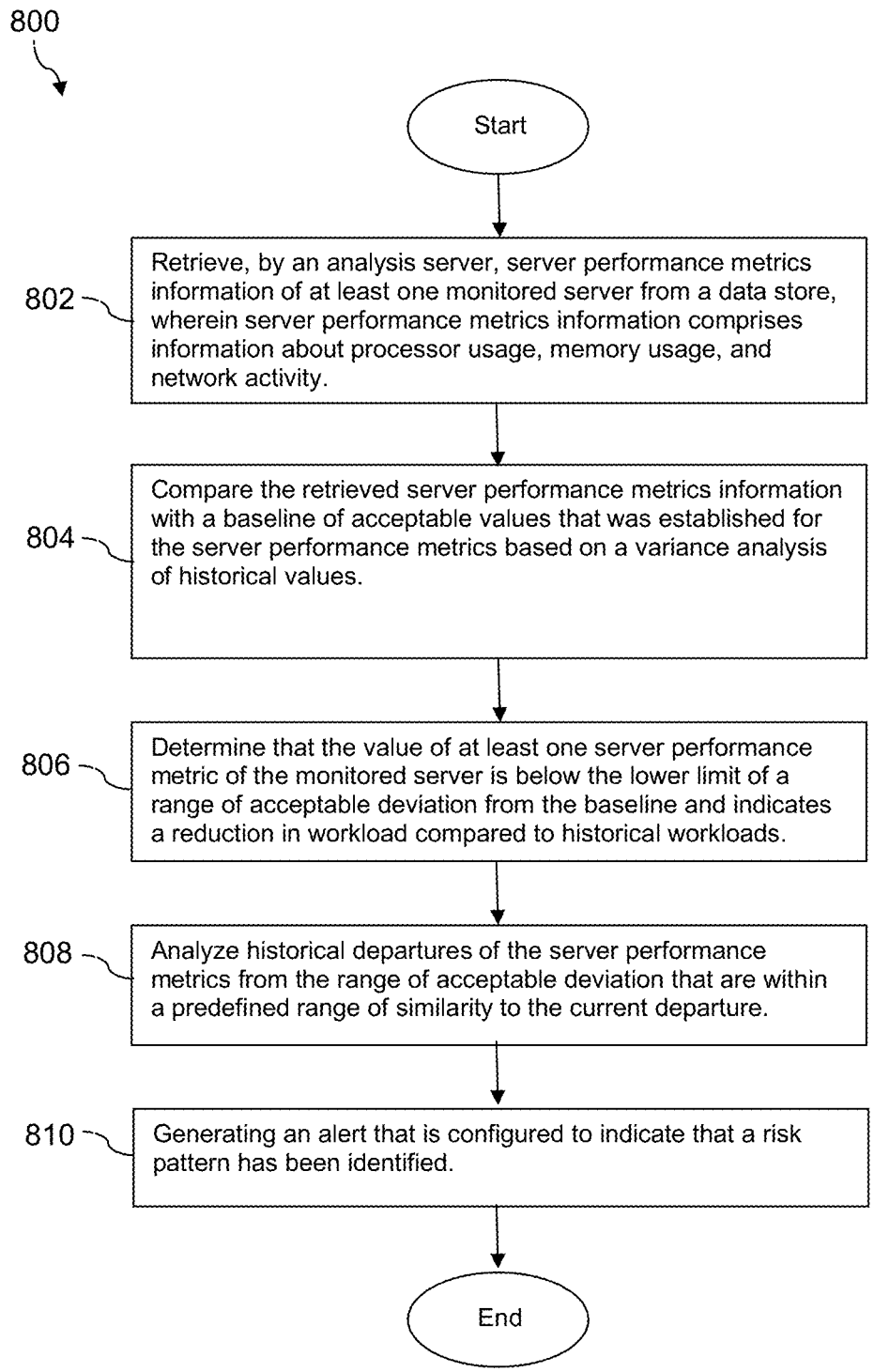
FIG. 5 is a flowchart of a method according to an embodiment of the disclosure.

Turning now to FIG. 5, a method 800 is described. In an embodiment, the method 800 may be performed by one or more elements of the communication system 100 described hereinabove with reference to FIG. 1. At block 802, an analysis server may retrieve server performance metrics information of at least one monitored server from a data store. In an embodiment, the server performance metrics information may comprise information about processor usage, memory usage, network activity, and/or information about something else.

At block 804, the retrieved server performance metrics information may be compared with a baseline of acceptable values that was established for the server performance metrics based on a variance analysis of historical values. The variance analysis of historical values may be a variance analysis of historical values for each hour of each day of the week, of the one or more metrics of the monitored server during periods of acceptable server performance. The value of at least one server performance metric of the monitored server may be determined to be below the lower limit of a range of acceptable deviation from the baseline at block 806. The value of the at least one server performance metric may be determined to indicate a reduction in workload compared to historical workloads. In some cases, a server performance metric that is below the lower limit of the range of acceptable deviation may follow a similar server performance pattern to the server performance pattern described hereinabove with reference to FIG. 2D.

At block 808, an analysis of historical departures of the server performance metrics from the range of acceptable deviation may be performed. In an embodiment, the historical departures that are analyzed may be within a predefined range of similarity to the current departure. At block 810, an alert may be generated. The alert may be sent to a work station. The alert may be configured to indicate that a risk pattern has been identified and may be further configured to suggest examining the network packet rate to see if there is a drop in workload from an upstream server. If so, investigate performance of the upstream server. If not, investigate this server for constraint starting with disk service times or database performance. Perform maintenance in order to return the server performance metrics to values within the range of acceptable deviation. In an embodiment, the suggestion to investigate disk service times or database performance may be based on a result of the analysis of historical occurrences that indicates that, historically, these have been reasons for similar departures from the range of acceptable deviation.

In an embodiment, a plurality of servers performing substantially the same function may exhibit substantially similar historical performance metrics. In this case, at block 806, if the metrics of one server is determined to have dipped below a metrics baseline established by the plurality of servers while the metrics of the remaining servers among the plurality of servers performing substantially the same function continue at or near the metrics baseline, this may be an indication of load balancer problem and may suggest performing maintenance on the load balancer. Then, at block 810, an alert may be generated. The alert may be sent to a work station. The alert may be configured to indicate that a risk pattern has been identified and may be further configured to suggest performing maintenance on a load balancer in order to return the server performance metrics to values within the range of acceptable deviation. In an embodiment, the suggestion to perform maintenance on the load balancer may be based on a result of the analysis of historical occurrences that indicates that, historically, a load balancer failure has been a reason for similar departures from the range of acceptable deviation.

Figure 6:
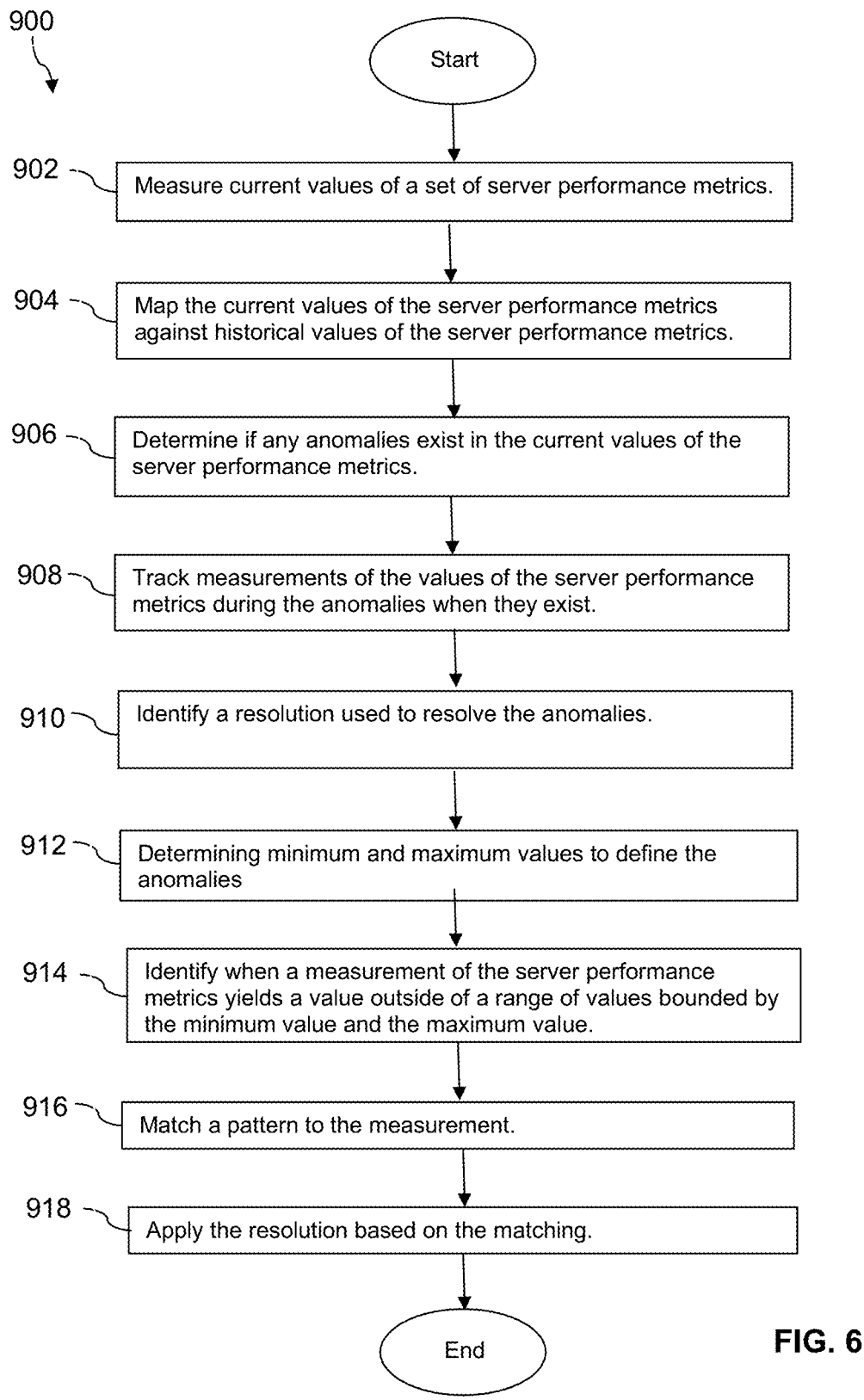
FIG. 6 is a flowchart of a method according to an embodiment of the disclosure.

Turning now to FIG. 6, a method 900 is described. In an embodiment, the method 900 may be performed by one or more elements of the communication system 100 discussed with reference to FIG. 1. At block 902, the current values of a set of server performance metrics may be measured. The current values of the server performance metrics may be mapped at block 904 against historical values of the server performance metrics. At block 906, it may be determined whether any anomalies exist in the current values of the server performance metrics. Measurements of the values of the server performance metrics during the anomalies may be tracked when they exist at block 908.

A resolution used to resolve the anomalies may be identified at block 910. Minimum and maximum values may be determined to define the anomalies at block 912. In an embodiment, an anomaly may be said to have occurred when server performance metrics reach values outside of the range of values bounded by the minimum value and the maximum value set to define anomalies. At block 914, identify when a measurement of the server performance metrics yields a value outside of a range of values bounded by the minimum value and the maximum value. A pattern may be matched to the measurement at block 916. The resolution may be applied at block 918 based on the matching.

Figure 7:
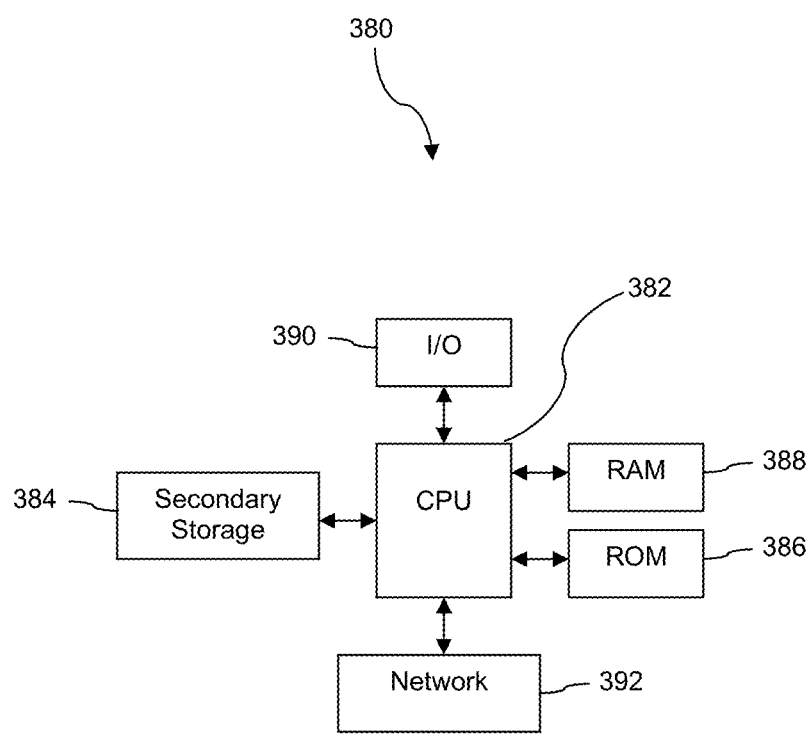
FIG. 7 illustrates an exemplary computer system suitable for implementing the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer specification 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. A method of maintaining server performance in a network, comprising:
  receiving, at an analysis server of the network, server performance metrics from at least one monitored server, wherein server performance metrics comprise information about processor usage, memory usage, and network activity;
  comparing, by the analysis server, the received server performance metrics with a baseline of values that was established for the server performance metrics based on a variance analysis of historical values;
  determining, by the analysis server, that the value of at least one server performance metric of the monitored server is consistently above an upper limit of a range of acceptable deviation from the baseline over a defined time, wherein the value of the at least one server performance metric determined to be consistently above the upper limit is a departure from the range of acceptable deviation;
  analyzing, by the analysis server, historical occurrences of similar departures of server performance metrics from the range of acceptable deviation over the defined time, wherein the analysis identifies historical occurrences being within a predefined range of similarity to the departure by the at least one monitored server over the defined time;
  generating, by the analysis server for a work station, an alert indicating that a risk pattern of reduced server performance has been identified based on the analysis and suggesting shutting down a locked process on the monitored server; and
  shutting down, via the work station, the locked process on the monitored server in response to the alert, wherein shutting down the locked process returns the server performance metrics to values within the range of acceptable deviation.

2. The method of claim 1, further comprising:
  generating, by the analysis server, a trace of the values of the server performance metrics compared to the baseline and the range of acceptable deviation from the baseline.

3. The method of claim 1, wherein the similar departures that are analyzed are at least 80 percent similar to the current departure from the range of acceptable values.

4. The method of claim 1, wherein the variance analysis is a variance analysis of historical values for each hour of each day of the week, of the one or more metrics of the monitored server during periods of acceptable server performance.

5. The method of claim 4, wherein the server performance metric values for each hour of a day are calculated into the baseline at the end of the day.

6. The method of claim 1, wherein the suggestion to shutting down the locked process is based on a result of the analysis of historical occurrences that indicates that, historically, a locked process has been a reason for the server performance metrics to be consistently above the range of acceptable deviation.

7. The method of claim 1, wherein the range of acceptable deviation is bounded by a upper limit and a lower limit of server performance values that a server reaches without triggering an alert.

8. The method of claim 1, wherein the analyzing, by the analysis server, comprises generating a trace of server performance metrics and determining whether server performance metrics correspond with a pattern of historic performance values within a predefined range of similarity over the defined time.

9. The method of claim 1, further comprising adjusting, by the analysis server, the range of acceptable deviation from the baseline based on at least one of: analysis of loads on monitored servers, a change in a server performance metric corresponding to a beginning of production workload processing, a decrease in amplitude of the server performance metric while maintaining a magnitude over the defined time, or a server performance metric with an amplitude and magnitude without the range of acceptable deviation but shifted on a time basis.

10. A method of maintaining server performance in a network, comprising:
retrieving, by an analysis server of the network, server performance metrics information of at least one monitored server from a data store, wherein server performance metrics information comprises information about processor usage, memory usage, and network activity;
comparing, by the analysis server, the retrieved server performance metrics information of the at least one monitored server with a baseline of acceptable values that was established for the server performance metrics based on a variance analysis of historical values;
determining, by the analysis server, that the value of at least one server performance metric of the at least one monitored server is steadily below the lower limit of a range of acceptable deviation from the baseline over a defined time and indicates a reduction in processing workload compared to historical processing workloads, wherein the value of the at least one server performance metric determined to be steadily below the lower limit is a departure from the range of acceptable deviation;
analyzing, by the analysis server, historical departures of the server performance metrics from the range of acceptable deviation that are within a predefined range of similarity to the departure over the defined time, wherein the analysis identifies a risk pattern of reduced server performance;
generating, by the analysis server, an alert that is configured to indicate that a risk pattern of reduced server performance has been identified based on the analysis; and
in response to the alert, performing maintenance on a load balancer of the network.

11. The method of claim 10, wherein server performance metrics information contained in the data store is stored in the data store by the monitored server.

12. The method of claim 10, wherein performing maintenance on the load balancer of the network returns the server performance metrics to values within the range of acceptable deviation, and wherein performing maintenance on the load balancer is based on a result of the analysis of historical occurrences that indicates that, historically, a load balancer failure has been a reason for similar departures from the range of acceptable deviation.

13. The method of claim 10, wherein the alert is assigned an urgency value based on the analysis of historical departures.

14. The method of claim 13, wherein the alert is ranked in a queue according to the urgency value assigned.

15. The method of claim 10, wherein the range of acceptable deviation is bounded by an upper limit and a lower limit of server performance values that a server reaches without triggering an alert.

16. The method of claim 10, further comprising adjusting, by the analysis server, the range of acceptable deviation from the baseline based on at least one of: analysis of loads on monitored servers, a change in a server performance metric corresponding to a beginning of production workload processing, a decrease in amplitude of the server performance metric while maintaining a magnitude over the defined time, or a server performance metric with an amplitude and magnitude without the range of acceptable deviation but shifted on a time basis.

17. The method of claim 10, wherein the analyzing, by the analysis server, comprises generating a trace of server performance metrics and determining whether server performance metrics correspond with a pattern of historic performance values within a predefined range of similarity over the defined time.

* * * * *